United States Patent
Gorney et al.

(10) Patent No.: US 10,294,688 B2
(45) Date of Patent: *May 21, 2019

(54) MULTI-AXIAL MAST POSITIONING SYSTEM

(71) Applicant: US Tower Corporation, Lincoln, KS (US)

(72) Inventors: Robert E. Gorney, Three Rivers, CA (US); Kenneth Pereira, Woodlake, CA (US); Jason Timothy Wadlington, Visalia, CA (US)

(73) Assignee: US Tower Corporation, Lincoln, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,042

(22) Filed: May 4, 2018

(65) Prior Publication Data

US 2018/0266136 A1 Sep. 20, 2018

Related U.S. Application Data

(63) Continuation of application No. 15/442,552, filed on Feb. 24, 2017, now Pat. No. 10,012,004, which is a
(Continued)

(51) Int. Cl.
*F16M 11/20* (2006.01)
*E04H 12/18* (2006.01)
(Continued)

(52) U.S. Cl.
CPC ........... *E04H 12/182* (2013.01); *E04H 12/18* (2013.01); *E04H 12/187* (2013.01);
(Continued)

(58) Field of Classification Search
CPC ... E04H 12/182; E04H 12/187; E04H 12/345; E04H 12/2284; E04H 12/18;
(Continued)

(56) References Cited

U.S. PATENT DOCUMENTS

| 1,379,506 A | 5/1921 | Walther |
| 2,014,762 A | 9/1935 | Fergus |

(Continued)

FOREIGN PATENT DOCUMENTS

| CA | 2842902 A1 * | 8/2015 | ............ E02F 3/3677 |
| EP | 1148579 A2 | 10/2001 | |

*Primary Examiner* — Brent W Herring
(74) *Attorney, Agent, or Firm* — Glass and Associates; Kenneth D'Alessandro; Kenneth Glass

(57) ABSTRACT

A tiltable telescoping support structure positioning system includes a frame having first and second opposed vertical sections. A telescoping support structure is disposed between the first and second opposed vertical sections, the telescoping support structure having a plurality of telescoping sections extendable from a base section along a longitudinal axis thereof. The base section of the telescoping support structure is tiltably coupled to the first and second opposed vertical sections to permit the base section to tilt along a first tilt path towards either of the first and second opposed vertical sections of the frame. A tilting mechanism is coupled between the base section of the telescoping support structure so as to tilt the telescoping support structure about a second tilt path aligned perpendicular to the tilt path between the first and second opposed vertical sections of the frame.

7 Claims, 15 Drawing Sheets

Related U.S. Application Data continuation of application No. 15/054,263, filed on Feb. 26, 2016, now Pat. No. 9,587,412, which is a continuation of application No. 14/682,296, filed on Apr. 9, 2015, now Pat. No. 9,309,686.

(60) Provisional application No. 61/977,949, filed on Apr. 10, 2014.

(51) Int. Cl.

| | | |
|---|---|---|
| *F16M 13/02* | (2006.01) | |
| *E04H 12/22* | (2006.01) | |
| *E04H 12/34* | (2006.01) | |
| *F16M 11/28* | (2006.01) | |
| *F16M 11/42* | (2006.01) | |

(52) U.S. Cl.
CPC ....... *E04H 12/2284* (2013.01); *E04H 12/345* (2013.01); *F16M 11/2057* (2013.01); *F16M 11/28* (2013.01); *F16M 11/42* (2013.01); *F16M 13/022* (2013.01)

(58) Field of Classification Search
CPC .... F16M 11/42; F16M 11/2057; F16M 11/28; F16M 13/022
USPC ............... 52/111, 114, 116, 123.1; 343/869; 248/123.11, 123.2, 125.8, 125.9, 162.1, 248/157, 291.1, 292.11; 89/37.09
See application file for complete search history.

(56) References Cited

U.S. PATENT DOCUMENTS

| | | | |
|---|---|---|---|
| 2,113,143 A | | 4/1938 | Sanders |
| 2,318,633 A | * | 5/1943 | Ries ................. F16M 11/08 248/183.2 |
| 2,326,657 A | * | 8/1943 | Johnston ............ F16M 11/18 248/184.1 |
| 2,331,285 A | | 10/1943 | Allen et al. |
| 2,353,885 A | | 7/1944 | Fanger et al. |
| 2,413,703 A | | 1/1947 | Fischer |
| 2,554,019 A | * | 5/1951 | Du Bois ............... F41A 27/08 89/37.02 |
| 2,592,108 A | * | 4/1952 | Bader ................. H01Q 1/1235 52/117 |
| 2,616,768 A | | 11/1952 | Stemm |
| 2,676,677 A | | 4/1954 | Anderson et al. |
| 2,733,030 A | * | 1/1956 | Hawthorne ......... H01Q 1/1221 248/284.1 |
| 3,365,828 A | | 1/1968 | Badali et al. |
| 3,468,398 A | | 9/1969 | Galloway et al. |
| 3,501,031 A | | 3/1970 | Whitfield |
| 3,847,053 A | | 11/1974 | Ubelacker |
| 3,895,558 A | | 7/1975 | Schops |
| 3,978,990 A | | 9/1976 | Honea |
| 4,031,838 A | | 6/1977 | Schmidt et al. |
| 4,114,512 A | | 9/1978 | Schwendt |
| 4,222,307 A | | 9/1980 | Roettges et al. |
| 4,317,405 A | | 3/1982 | Ebner et al. |
| 4,341,452 A | * | 7/1982 | Korling .............. F16M 11/105 248/179.1 |
| 4,353,283 A | | 10/1982 | Crepin |
| 4,635,526 A | | 1/1987 | Mottana et al. |
| 4,706,543 A | | 11/1987 | Winkler et al. |
| 4,714,004 A | | 12/1987 | Weinfurth |
| 4,815,757 A | * | 3/1989 | Hamilton ............ B60R 11/04 182/69.4 |
| 4,903,442 A | | 2/1990 | Trommen |
| 5,002,252 A | | 3/1991 | Setala et al. |
| 5,102,375 A | | 4/1992 | Featherstone |
| 5,697,457 A | | 12/1997 | Back |
| 5,880,395 A | | 3/1999 | Krumm et al. |
| 6,244,450 B1 | | 6/2001 | Woodling |
| 6,354,750 B1 | * | 3/2002 | Romanoff ............. G03B 17/00 248/183.2 |
| 6,412,737 B1 | | 7/2002 | Minagawa |
| 6,484,987 B2 | * | 11/2002 | Weaver ................ F16M 11/10 248/278.1 |
| 6,705,773 B2 | | 3/2004 | Fix |
| 7,000,357 B1 | * | 2/2006 | Stearns ............... H01Q 1/1235 52/110 |
| 7,121,745 B2 | * | 10/2006 | Chapman ............. B66F 11/048 396/428 |
| 7,252,441 B2 | * | 8/2007 | Chapman ................ B60R 11/04 212/198 |
| 7,367,368 B2 | | 5/2008 | Smitherman |
| 7,429,035 B2 | | 9/2008 | Metcalf et al. |
| 7,497,140 B2 | | 3/2009 | Blackwelder et al. |
| 7,574,832 B1 | | 8/2009 | Lieberman |
| 7,621,077 B1 | | 11/2009 | Perina et al. |
| 7,784,812 B1 | | 8/2010 | Lares |
| 7,788,858 B1 | | 9/2010 | Ammons |
| 7,926,670 B2 | * | 4/2011 | Schneider ............ B66F 11/046 182/2.11 |
| 7,989,979 B2 | * | 8/2011 | Burgess ................. B60Q 1/245 307/10.1 |
| 7,997,388 B2 | * | 8/2011 | Nieboer ................ H01Q 1/125 187/222 |
| 8,057,112 B2 | * | 11/2011 | Amadril ............... B66F 11/048 248/123.2 |
| 8,365,471 B2 | | 2/2013 | Diniz et al. |
| 8,413,390 B2 | * | 4/2013 | Pereira .................... E04H 12/00 343/883 |
| 8,522,511 B2 | | 9/2013 | Thoren et al. |
| 8,534,004 B2 | | 9/2013 | Kardohely et al. |
| 8,584,391 B1 | | 11/2013 | Calvert |
| 8,833,519 B1 | | 9/2014 | Glazer et al. |
| 9,003,719 B2 | * | 4/2015 | Kwartler ............... E04H 12/182 52/116 |
| 9,260,045 B2 | * | 2/2016 | Chapman ................ B60P 1/435 |
| 9,309,686 B2 | * | 4/2016 | Gorney ................ E04H 12/182 |
| 9,476,433 B2 | * | 10/2016 | Jang ..................... F15B 15/068 |
| 9,587,412 B2 | * | 3/2017 | Gorney ................ E04H 12/182 |
| 10,012,004 B2 | * | 7/2018 | Gorney ................ E04H 12/182 |
| 2002/0084396 A1 | * | 7/2002 | Weaver .................. F16M 11/10 248/278.1 |
| 2003/0076480 A1 | * | 4/2003 | Burbulla ............... B66F 11/048 352/243 |
| 2003/0161622 A1 | | 8/2003 | Zantos |
| 2004/0208499 A1 | | 10/2004 | Grober |
| 2005/0191049 A1 | * | 9/2005 | Chapman ............. B66F 11/048 396/428 |
| 2006/0123967 A1 | | 6/2006 | Smitherman |
| 2006/0201076 A1 | * | 9/2006 | Blackwelder ......... E04H 12/182 52/118 |
| 2007/0058968 A1 | * | 3/2007 | Chapman ................ B60R 11/04 396/428 |
| 2008/0060822 A1 | | 3/2008 | Salmi et al. |
| 2009/0097840 A1 | * | 4/2009 | Amadril ............... B66F 11/048 396/428 |
| 2010/0276386 A1 | * | 11/2010 | Schneider ............ B66F 11/046 212/291 |
| 2012/0079778 A1 | | 4/2012 | Wasson et al. |
| 2012/0151852 A1 | | 6/2012 | Thoren et al. |
| 2012/0151853 A1 | | 6/2012 | Thoren et al. |
| 2013/0068558 A1 | * | 3/2013 | Schneider ............ B66F 11/046 182/63.1 |
| 2013/0322996 A1 | * | 12/2013 | Chapman ................ B60P 1/433 414/495 |
| 2014/0096401 A1 | * | 4/2014 | Prohaska ............... A01G 3/088 30/379.5 |
| 2014/0259986 A1 | * | 9/2014 | Kwartler ............. E04H 12/182 52/118 |
| 2015/0042811 A1 | | 2/2015 | Avignon et al. |
| 2015/0048233 A1 | | 2/2015 | Dumas |
| 2015/0152998 A1 | | 6/2015 | Intravatola |
| 2015/0233077 A1 | * | 8/2015 | Linley .................... E02F 3/3677 74/606 R |
| 2015/0267722 A1 | * | 9/2015 | Jang ..................... F15B 15/068 92/31 |

(56) References Cited

U.S. PATENT DOCUMENTS

| | | |
|---|---|---|
| 2015/0292227 A1 | 10/2015 | Gorney et al. |
| 2016/0376806 A1 | 12/2016 | Vetesnik |
| 2017/0122490 A1 | 5/2017 | Verstrate et al. |
| 2017/0167157 A1 | 6/2017 | Gorney et al. |
| 2017/0237242 A1* | 8/2017 | Ewert .................. H02G 1/02 |
| | | 451/39 |

* cited by examiner

MULTI-AXIAL MAST POSITIONING SYSTEM

CROSS-REFERENCE TO RELATED APPLICATIONS

The present application is a continuation of U.S. patent application Ser. No. 15/442,552, filed Feb. 14, 2017, which is a continuation of U.S. patent application Ser. No. 15/054,263, filed on Feb. 26, 2016, now U.S. Pat. No. 9,587,412, which is a continuation of U.S. patent application Ser. No. 14/682,296, filed on Apr. 9, 2015, now U.S. Pat. No. 9,309,686, issued Apr. 12, 2016 which claims the benefit of U.S. Provisional Patent Application Ser. No. 61/977,949, filed on Apr. 10, 2014, the contents of which are incorporated in this disclosure by reference in their entirety, the contents of which are incorporated in this disclosure by reference in their entirety.

BACKGROUND

Prior art does exist for an extendable mast connected to a skid via a linkage that allows pivoting of the mast with respect to the skid. A typical prior-art mast positioning system is taught by U.S. Pat. No. 7,997,388. This design is inherently limited in the orientation of the mast that it is able to achieve because of the type of actuators used, the positioning of the actuators relative to each other, the existence of a pivot point at the far end of the mast and by the linkage that is used to orient the mast. Due to all of these limitations, the system is only capable of orienting the mast in a substantially vertical position on a maximum slope of up to about 8 degrees.

Therefore, there is a need for an improved multi-axial mast positioning system that does not suffer from these limitations.

SUMMARY

A tiltable telescoping support structure positioning system includes a frame having first and second opposed vertical sections. A telescoping support structure is disposed between the first and second opposed vertical sections, the telescoping support structure having a plurality of telescoping sections extendable from a base section along a longitudinal axis thereof. The base section of the telescoping support structure is tiltably coupled to the first and second opposed vertical sections to permit the base section to tilt along a first tilt path towards either of the first and second opposed vertical sections of the frame. A tilting mechanism is coupled between the base section of the telescoping support structure so as to tilt the telescoping support structure about a second tilt path aligned perpendicular to the tilt path between the first and second opposed vertical sections of the frame.

DRAWINGS

These and other features, aspects and advantages of the present invention will become better understood with regard to the following description, appended claims, and accompanying drawings where:

DESCRIPTION

According to one embodiment of the present invention, a multi-axial mast leveling system according to the present invention is capable of positioning a mast at any desired orientation independent of the pallet (or other support structure) by which it is supported. This capability is achieved by use of at least two continuous rotation actuators oriented in two planes that are orthogonal relative to each other.

Figure 1:
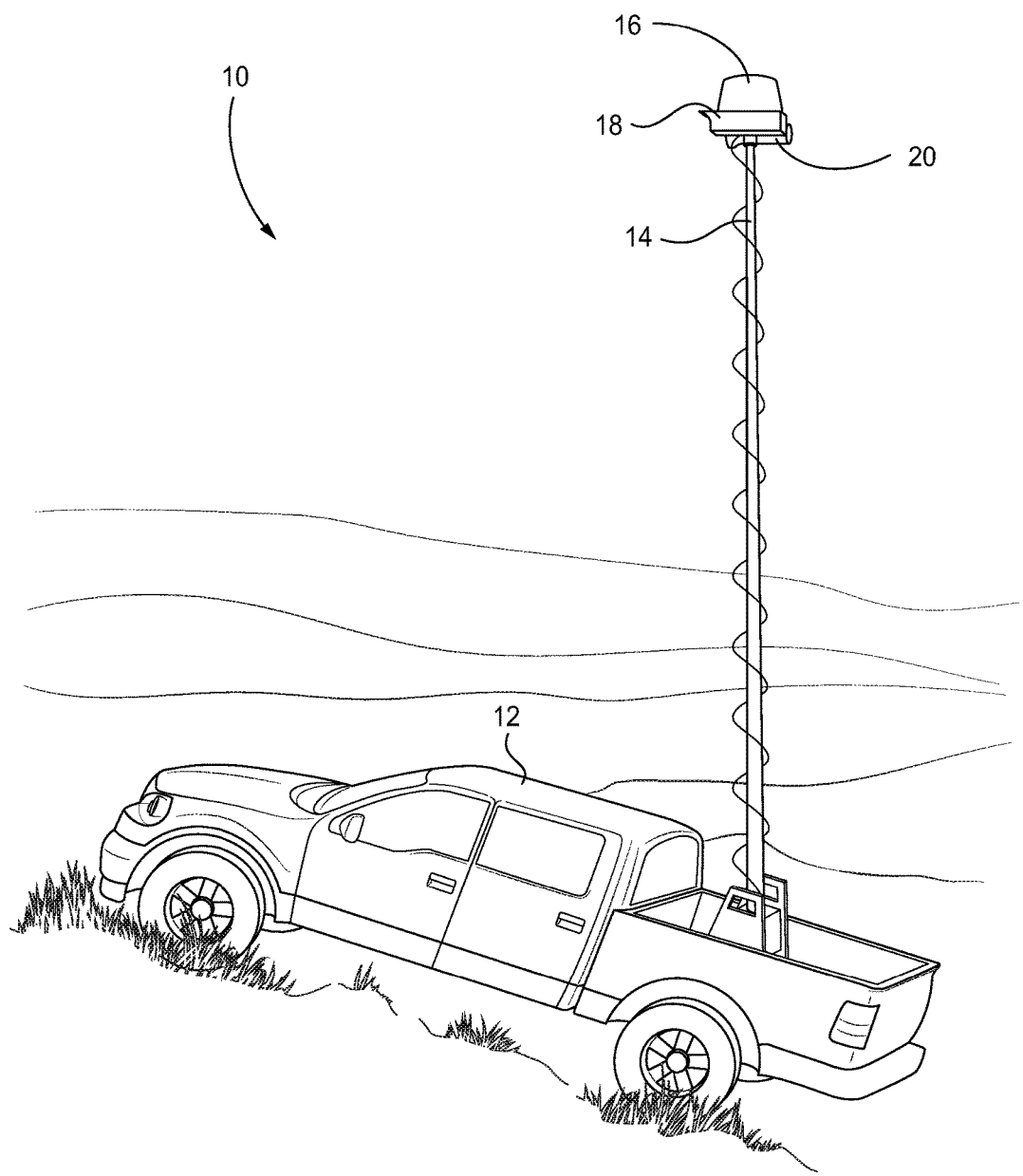
FIG. 1 is a diagram showing an illustrative embodiment of the present invention mounted on the bed of a pickup truck.
Figure 2:
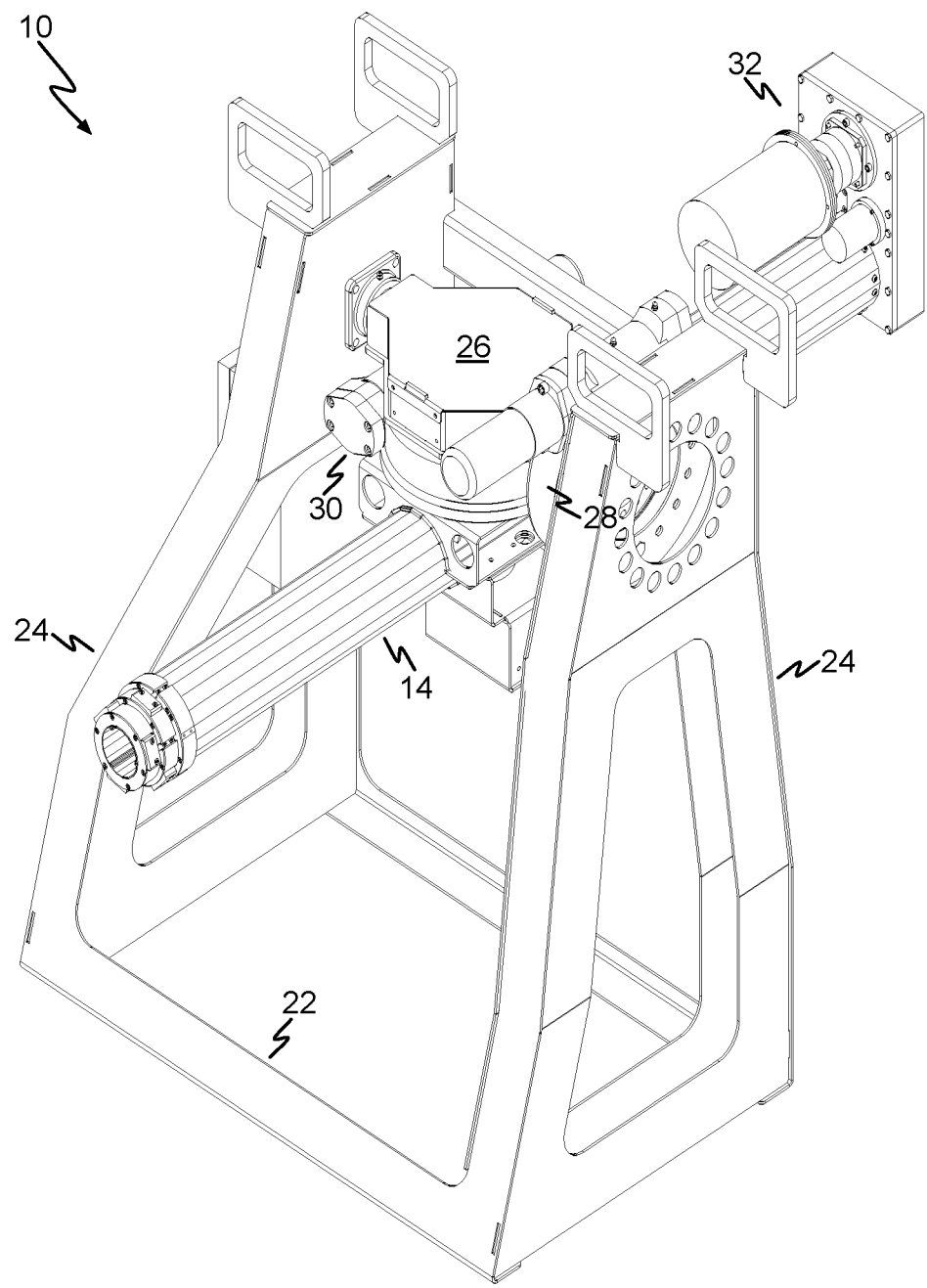
FIG. 2 is a diagram showing an isometric view of an illustrative embodiment of the present invention in a common stowed position.
Figure 3:
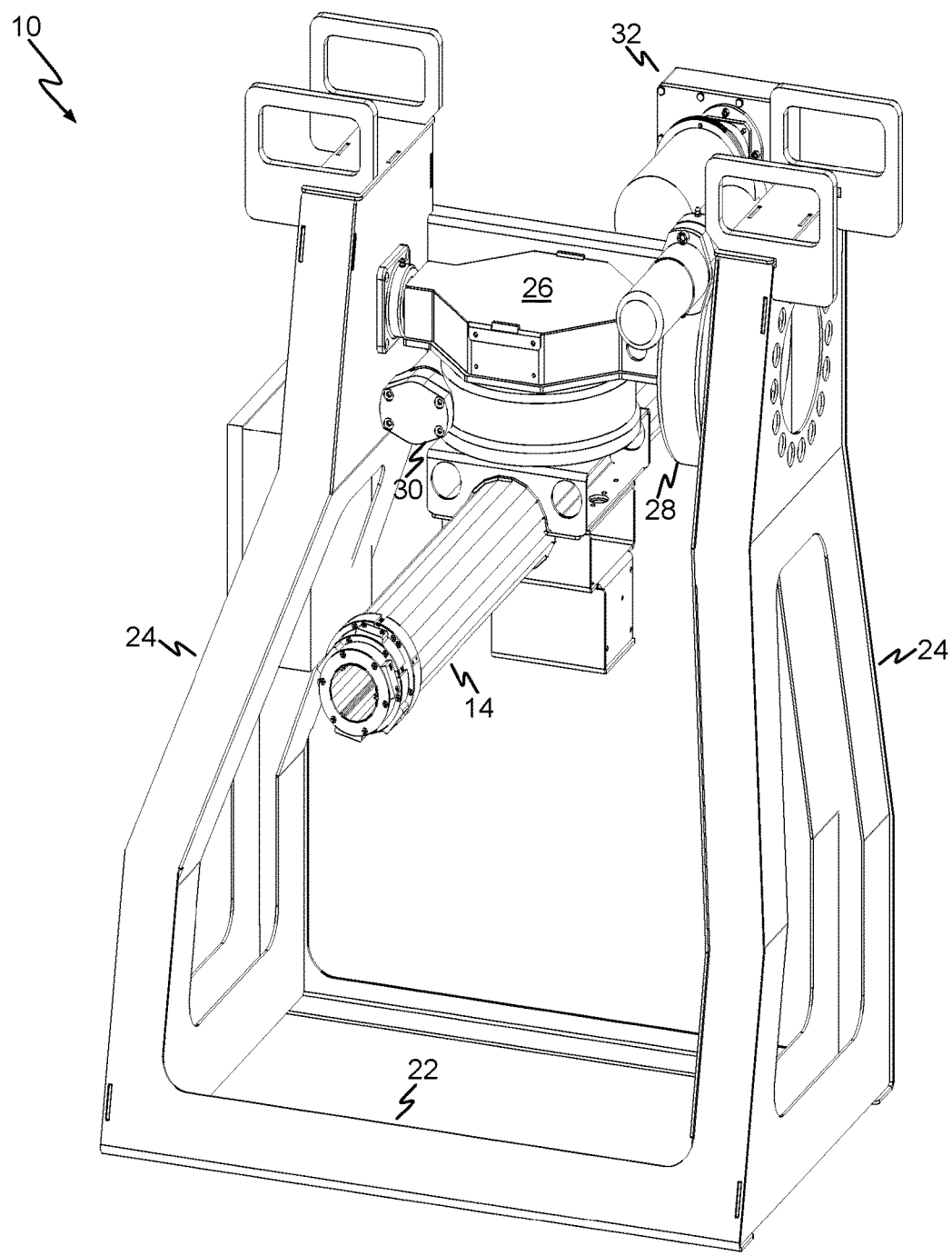
FIG. 3 is a diagram showing another isometric view of an illustrative embodiment of the present invention in a common stowed position.
Figure 4:
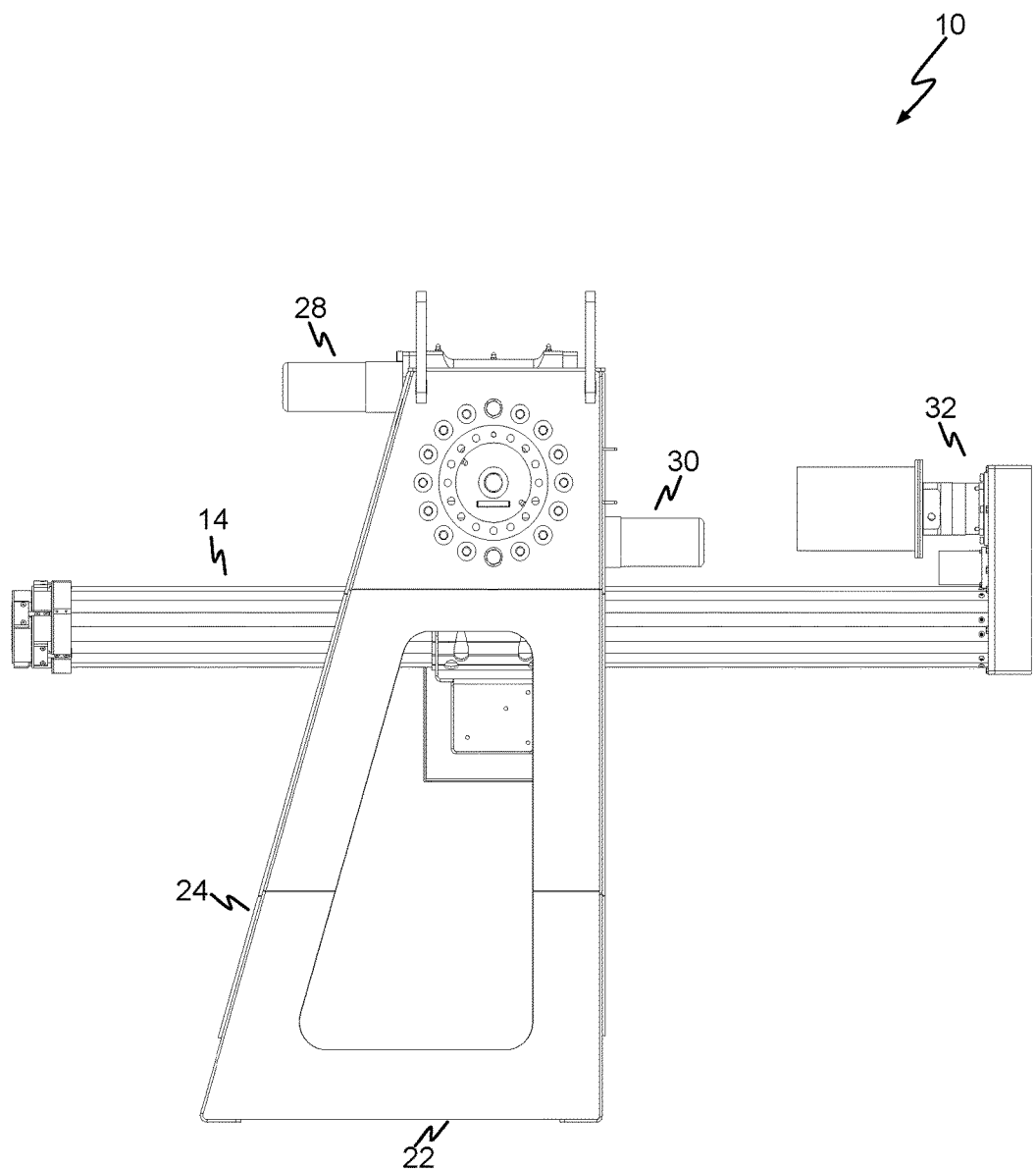
FIG. 4 is a diagram showing a side view of an illustrative embodiment of the present invention in a common stowed position.
Figure 5:
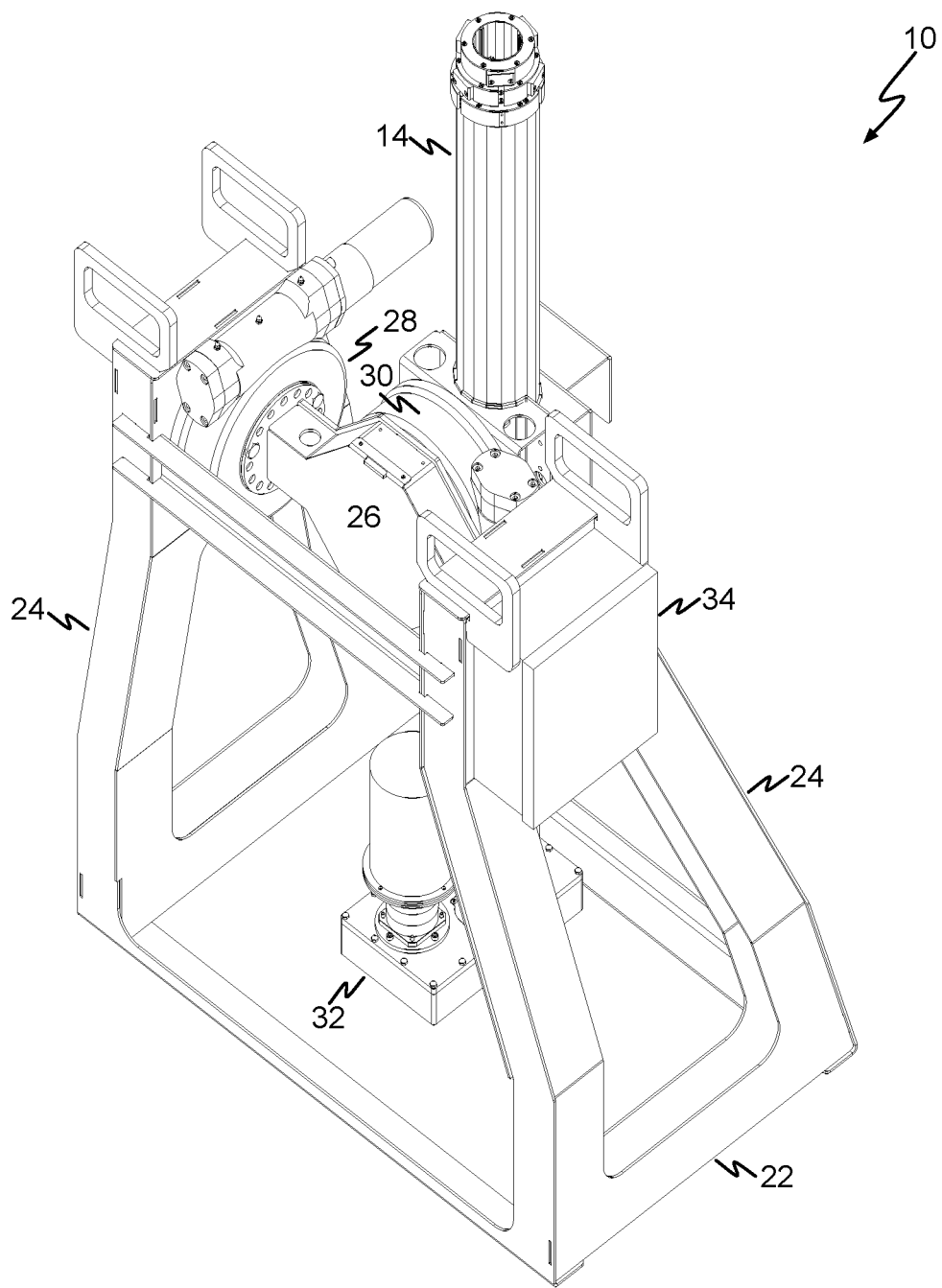
FIG. 5 is a diagram showing an isometric view of an illustrative embodiment of the present invention in a common at the ready position.
Figure 6:
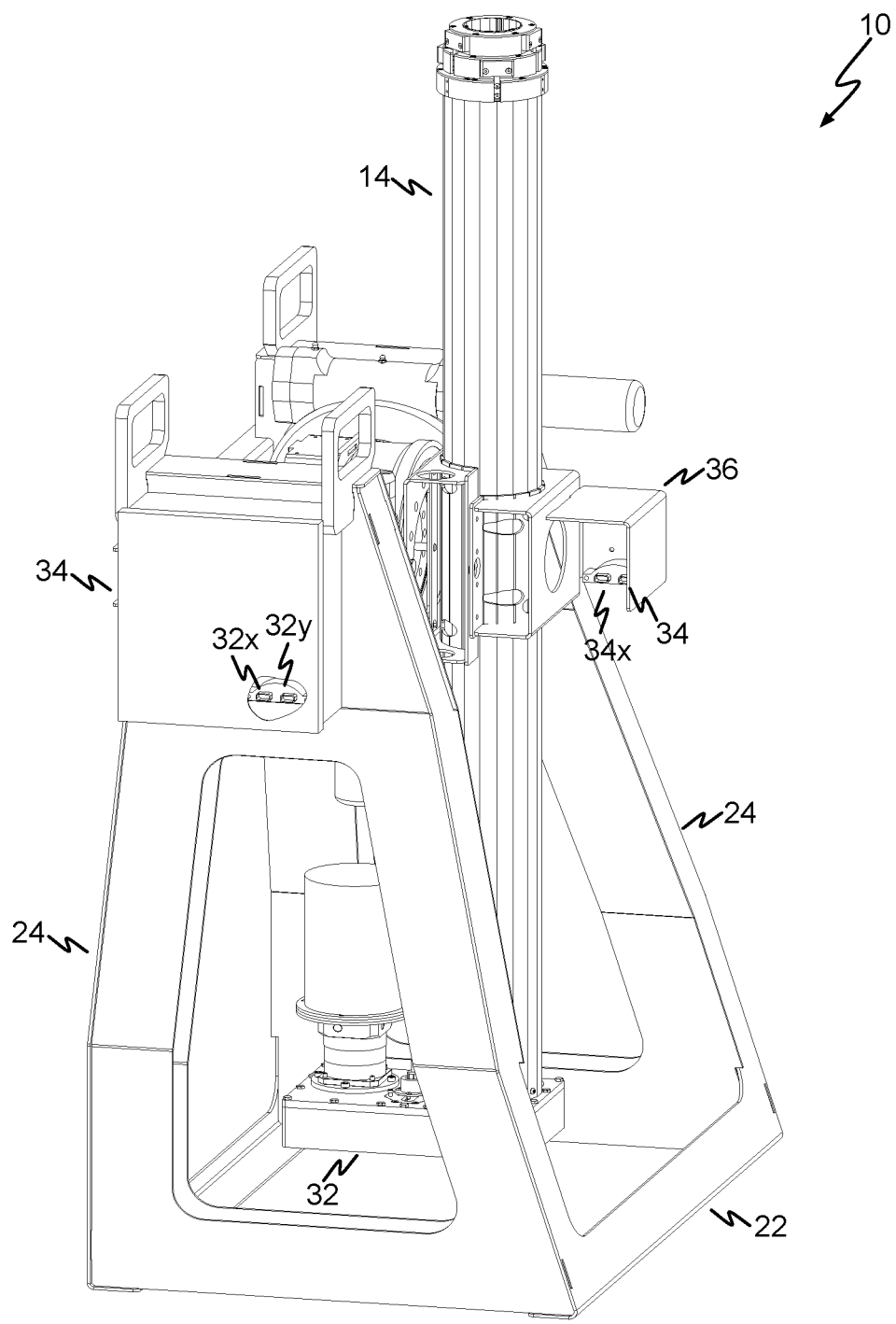
FIG. 6 is a diagram showing an isometric view of an illustrative embodiment of the present invention in a common at the ready position with portions of enclosure covers cut away to show inclinometers.
Figure 7:
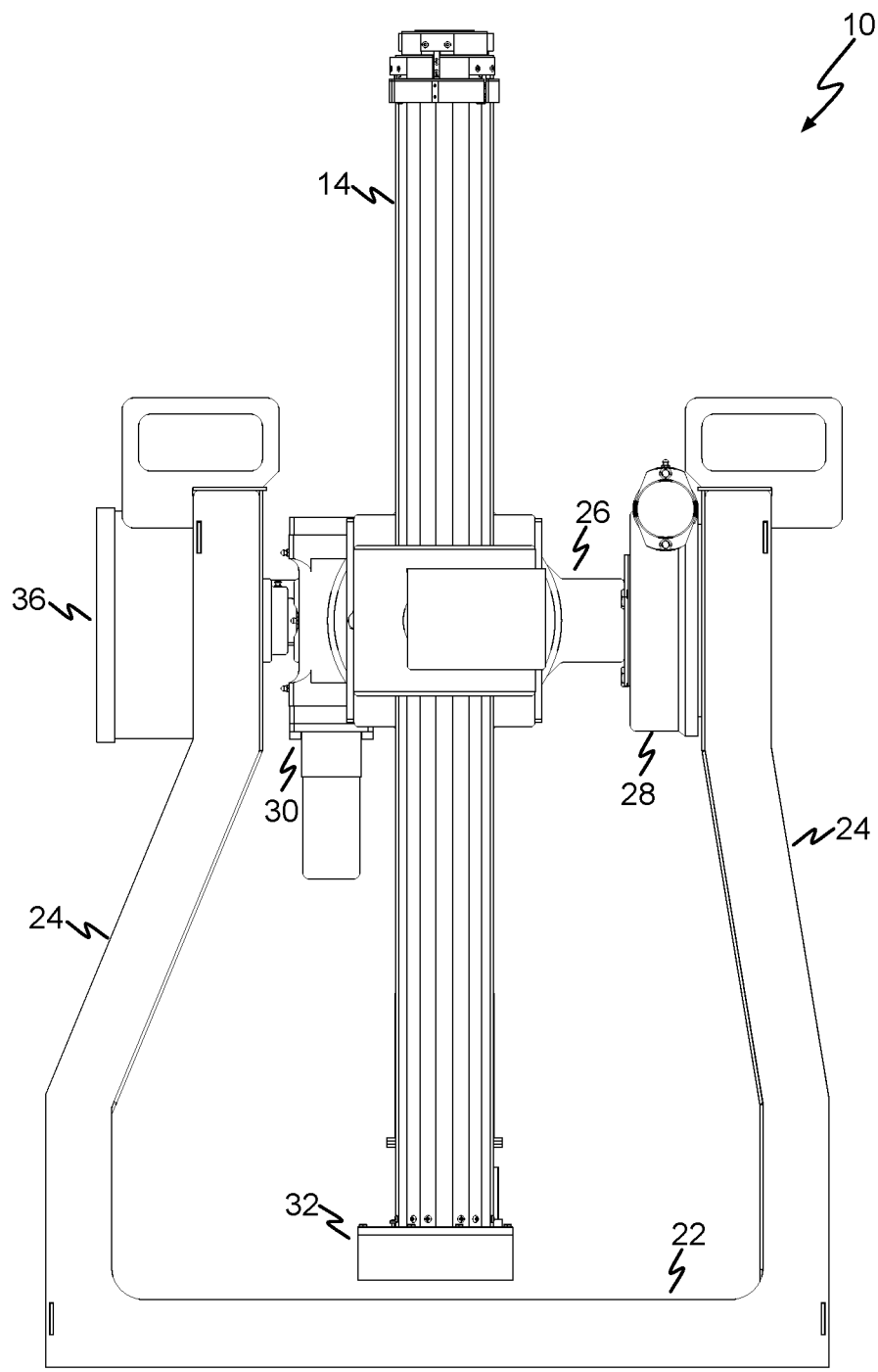
FIG. 7 is a diagram showing a front view of an illustrative embodiment of the present invention in a common at the ready position.
Figure 8:
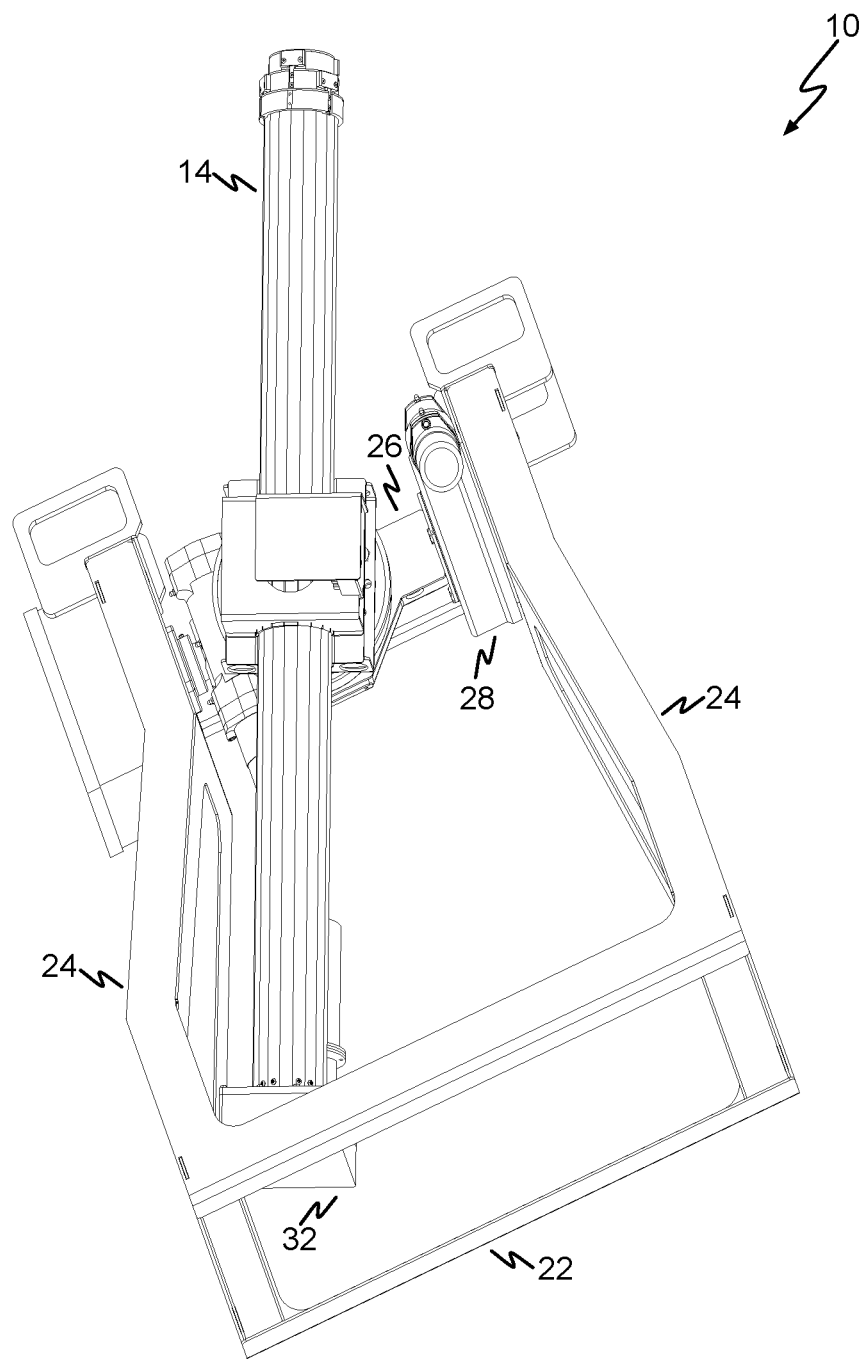
FIG. 8 is a diagram showing an isometric view of an illustrative embodiment of the present invention in a side-to-side tilted at-the-ready position.
Figure 9:
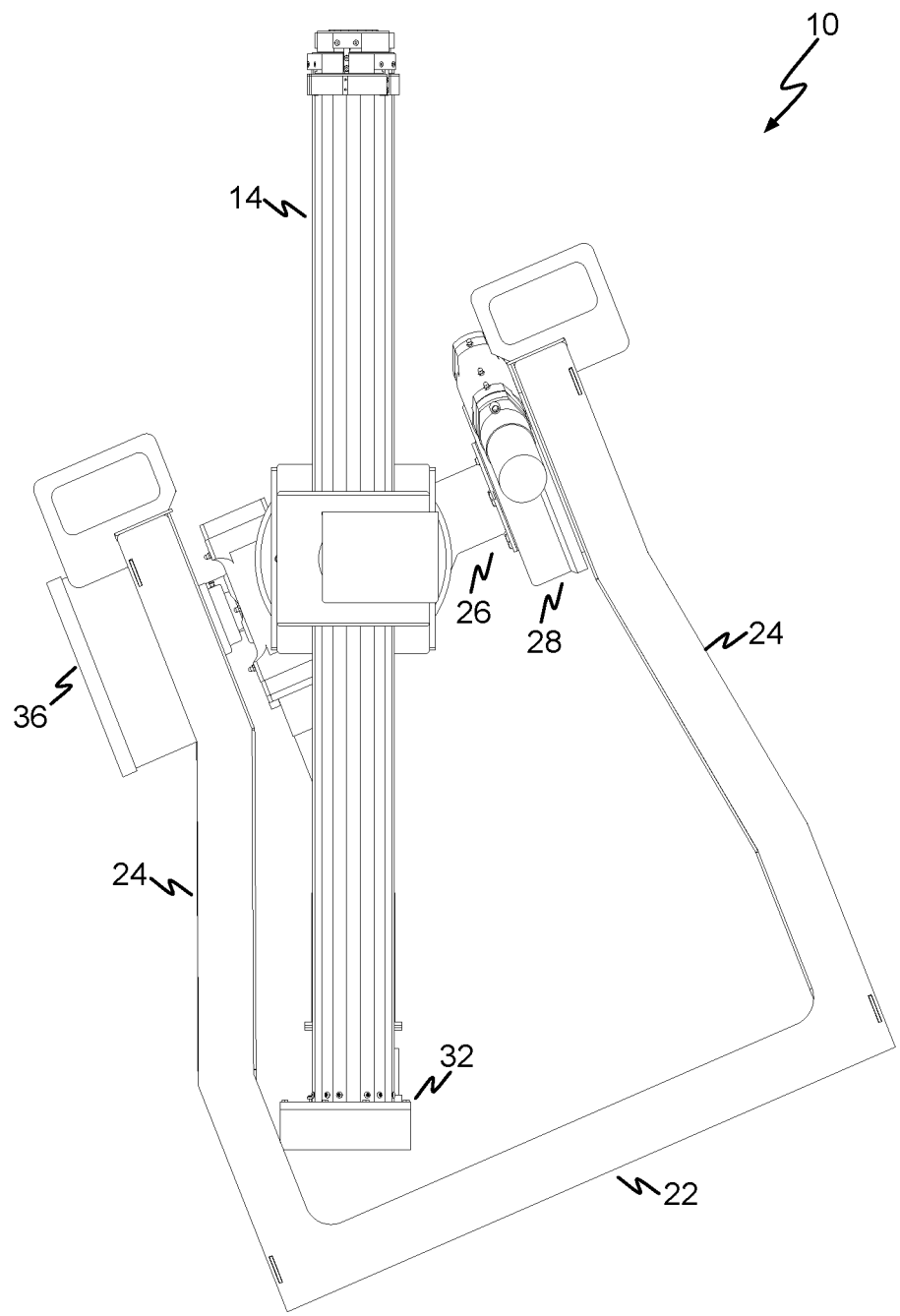
FIG. 9 is a diagram showing a front view of an illustrative embodiment of the present invention in a side-to-side tilted at-the-ready position.

The multi-axial mast leveling system 10 of the present invention is particularly useful for deploying masts mounted on mobile platforms, such as the bed of a pickup truck 12 as illustrated in FIG. 1. The mast 14 depicted in the system of FIG. 1 includes a radar dome 16, a daylight camera 18, and a night vision camera 20, although persons of ordinary skill in the art will appreciate that the payload shown in FIG. 1 is merely illustrative and non-limiting, and that the payload placed on the mast 14 in any particular application will depend solely on the application.

One illustrative embodiment of the multi-axial mast leveling system 10 of the present invention is shown in FIGS. 1-10.

According to one embodiment of the invention, the multi-axial mast positioning system of the present invention includes frame 22 having two opposed vertical support sections 24, an axle 26 coupled to the frame and rotatable by a rotary actuator 28 around a first axis passing through the opposed vertical sections of the frame. The mast 14 is coupled to the axle 26 and is also rotatable by a rotary actuator 30 about a second axis aligned with and perpendicular to the first axis. One type of actuator that can be used in the present invention is identified as model number ZKE9C-61MHA-1205RC-DB215 slewing drives manufactured by Kinematics Mfg. of Phoenix, Ariz. However, any rotational output gearbox or actuator (whether electrical, mechanical or hydraulic) can be used. These rotary actuators are particularly useful, among other reasons, due to their high gear ratio (61:1) which prevents back-drive of the rotary actuators and because of their high backward holding torque capabilities. The rotary actuators are able to rotate the mast 360° about two orthogonal axes, which allows the mast to be oriented to any desired orientation. This can be an operational orientation or an orientation that facilitates easy access to the payload atop the mast in order to make adjustments, perform maintenance, installation or removal. This arrangement of the rotary actuators 28 and 30 relative to each other also allows for each rotary actuator to act on the mast independent of all other actuators and without being limited by the mechanical limitations of its own range of movement, the range of movement of the other rotary positioners, or the physical limitation imposed by the structure of the mast or the pallet (or other supporting structure).

The mast 14 is preferably a telescoping mast and may be extended and retracted using a motor drive unit 32 as is known in the art. One example of such a mast is disclosed in U.S. Pat. No. 8,413,390.

Attachment of the mast 14 to the frame 22 (pallet or other support structure) occurs with at least one rotary positioner (28) being affixed to the mast at an intermediate position along the length of the mast and then that same rotary positioner being attached to the support structure. By at least one rotary actuator (28) acting on the mast at an intermediate position along the length of the mast, the mast requires a smaller linear displacement in which to achieve the same angular displacement compared to a system that would use either end of the mast as the pivot point.

The use of rotary actuators 28 and 30 allows each actuator to act in a motion concentric with the axis of rotation normal to the plane to which they are affixed. This feature eliminates the need for any multi-member linkage to act on the mast 14 to cause it to pivot about an offset pivot point. Elimination of a multi-member linkage improves the rigidity of the system while eliminating potential failure points of the system that would exist at all of the pivotal connections inherent in a multi-member linkage.

The embodiment depicted in FIGS. 2 through 10 uses a first rotary actuator 28 to drive axle 26. A second rotary actuator 30 is affixed to axle 26. An alternate embodiment of the multi-axial mast positioning system of the present invention as shown in FIGS. 11 and 12 utilizes a first rotary actuator 28 to rotate the mast 14 around a first axis passing through the opposed vertical sections of the frame as in the embodiment depicted in FIGS. 2 through 10. The frame 22 is mounted to a second rotary actuator 38 that is used to rotate the entire frame 22. Together, actuators 28 and 38 can level mast 14 in both X and Y directions. This embodiment does not use rotary actuator 30.

Figure 13:
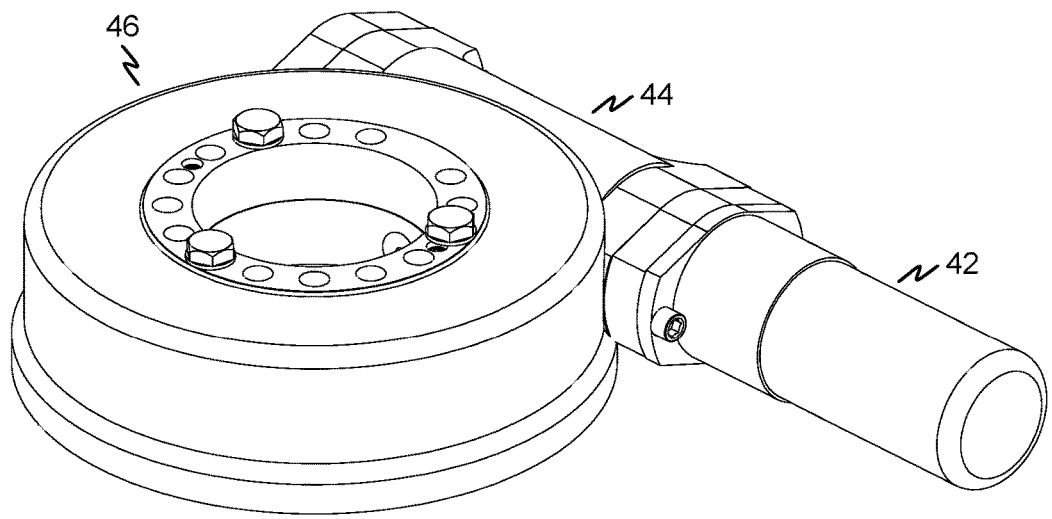
FIG. 13 is a diagram showing an illustrative rotary actuator that can be used in the present invention.

FIG. 13 depicts an illustrative rotary actuator that can be used with the present invention. The actuator includes a motor 42 driving a worm gear disposed inside of worm gear enclosure 44. The worm gear drives a planetary gear inside of planetary gear enclosure 46.

Figure 14:
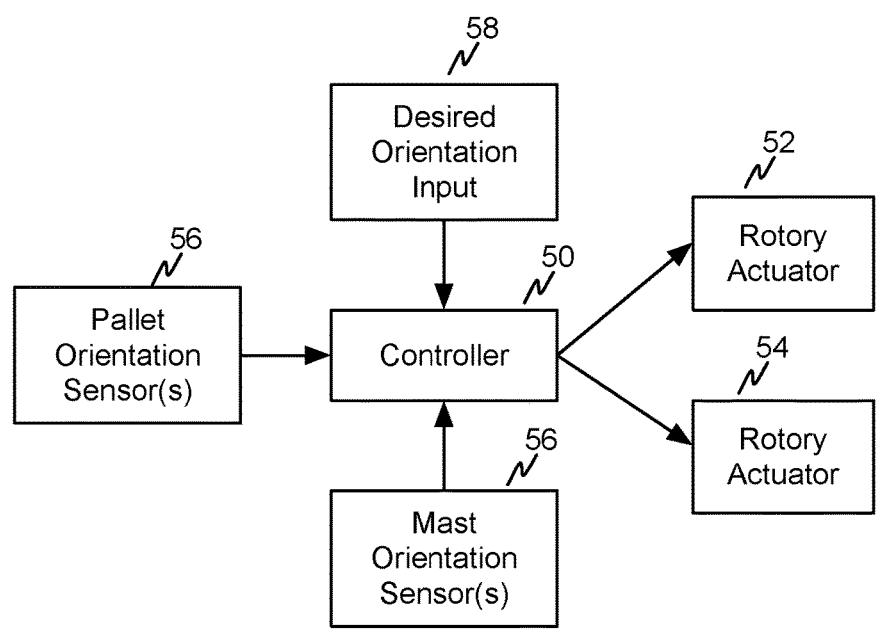
FIG. 14 is a block diagram showing exemplary control logic that may be used in the present invention.

The system is controlled by utilization of an integrated controller 50 to drive rotary actuators 52 and 54 as shown in FIG. 14. When the mast 14 is ready to be deployed, the controller 50 receives input from either an array of sensors or a single sensor (reference numeral 56) that is affixed to the pallet (or other support structure). In one embodiment of the invention, sensors $32x$ and $32y$ attached to the frame (shown in a cutout portion of an enclosure 34 in FIG. 6) report the inclination of the frame to the control system. Sensors 58 (sensors $34x$ and $34y$ shown in a cutout portion of an enclosure 36 in FIG. 6) attached to the mast 14 reports the inclination of the mast to the control system.

Next, it receives input from either a human or non-human operator (reference numeral 58) indicating what the desired orientation is relative to the orientation of the pallet (or other support structure). Once the desired orientation has been sent to the controller 50, the controller 50 then actuates the rotary actuators 52 and 54 to begin orienting the mast. As the mast is being oriented, the controller receives real-time input from either an array of sensors or a single sensor (reference numeral 58) affixed to the mast 14. It continually compares this input from the sensor(s) on the mast 14 to the desired orientation. Once all inputs have reached the predetermined position as determined by the controller based on the human or non-human input, the mast is ready to be extended.

Figure 15:
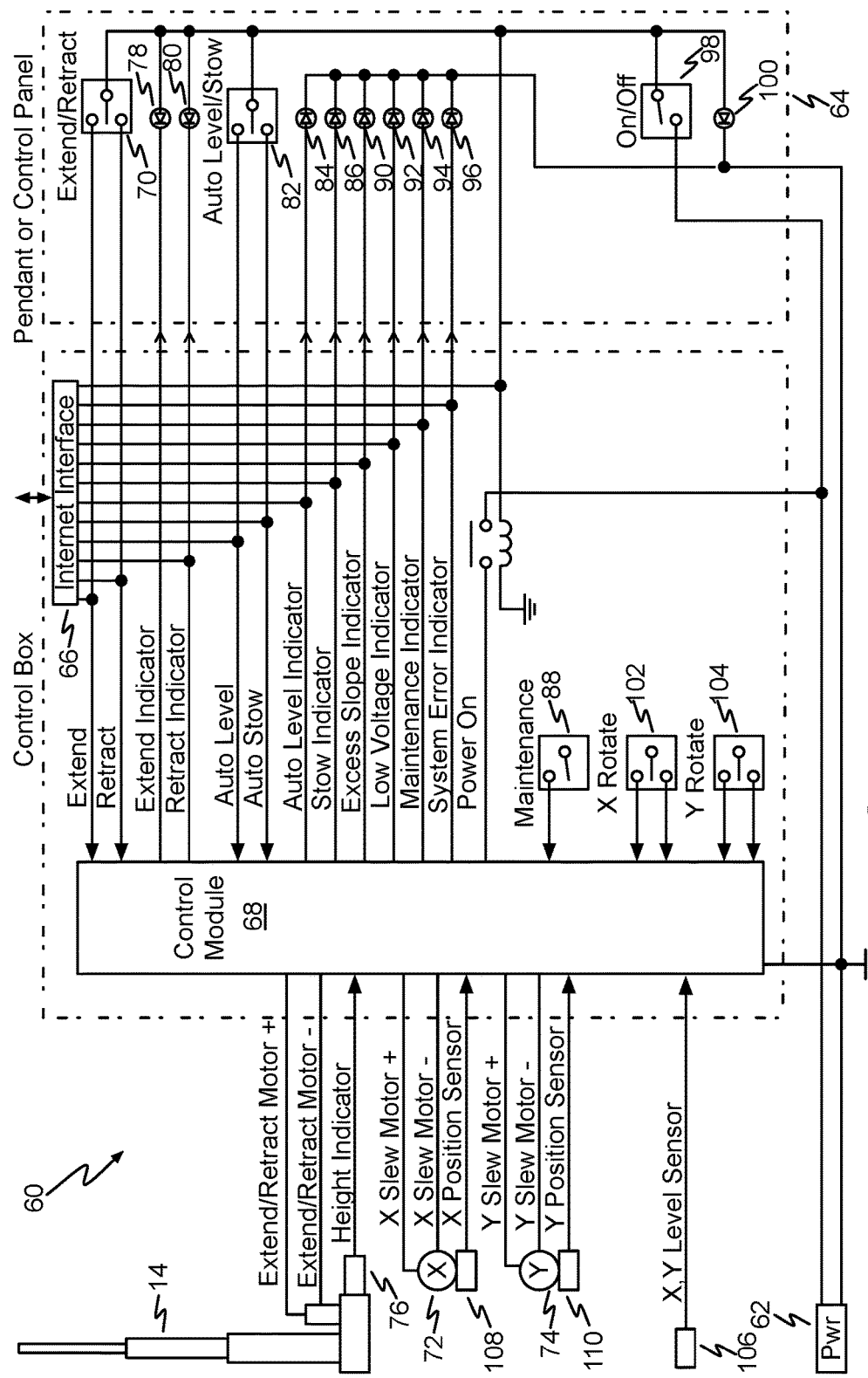
FIG. 15 is a block diagram showing an exemplary control configuration that may be used in the present invention.

FIG. 15 is a block diagram showing an exemplary control system 60 that may be used in the present invention. The controller system 60 can operate from a fixed voltage supply, such as 24V, shown at reference numeral 62. Persons of ordinary skill in the art will appreciate that the control system 60 depicted in FIG. 15 is merely illustrative and that other additional functions or fewer functions could be provided in other embodiments.

The control system 60 shown in FIG. 15 can employ a pendant or other control panel 64 connected to the other components in the control system 60 wirelessly or by a suitable cable. Provision may also be made to provide an Internet interface 66 to allow the control functions to be implemented remotely. Internet interfaces are well known in the art.

The control module 68 can employ a suitable microcontroller to implement all of the functions described. Implementation of such a control module 68 and microcontroller is well within the level of ordinary skill in the art.

The Extend/Retract functions used to extend and retract the mast 14 can be momentary functions enabled by a momentary switch 70. When Extend is selected, the X-slew motor 72 is rotated in the CW direction until the switch 70 is released. When Retract is selected, the Y-slew motor 74 is rotated in the CCW direction until the switch 70 is released. 0V on both X-slew Motor+ and X-slew Motor− lines stop the X-slew motor and 0V on both Y-slew Motor+ and Y-slew Motor− lines stop the Y-slew motor. If the mast 14 reaches the extend limit as sensed by the height indicator 76, further extension of the mast 14 will be inhibited. Likewise if the mast 14 reaches the retract limit as sensed by the height indicator, further retraction of the mast 14 will be inhibited. Both Extend and Retract functions will only operate when the MAINTENANCE switch is in NORMAL mode of operation.

The Extend Indicator 78 may be an LED that shows the status of the mast 14 when the mast is being extended. During the extend operation the Extend Indicator LED may be caused to flash, e.g., at a rate of approximately 1 Hz when the mast is being extended. If the extend limit is reached the Extend Indicator 78 LED may be caused to remain ON, and the mast 14 will no longer extend. When the extend function is not selected the Extend Indicator 78 LED will remain OFF.

The Retract Indicator 80 may be an LED that shows the status of the mast when the mast is being retracted. During the retract operation the Retract Indicator 80 LED can be caused to flash, e.g., at a rate of approximately 1 Hz when the mast is being retracted. If the retract limit is reached the Retract Indicator 80 LED can be caused to remain ON, and the mast will no longer retract. When the retract function is not selected the Retract Indicator 80 LED will remain OFF.

The Auto Level function is momentary function used to level the mast that may be enabled by a momentary switch 82. The mast 14 will not Auto Level unless the mast 14 is fully retracted. When Auto Level is selected the mast is automatically leveled. The signal must remain true until Level is reached, if it is not the function will terminate. Auto Level is achieved when the Auto Level Indicator is on. The Auto Level function will only operate when the MAINTENANCE switch is in the NORMAL mode of operation, Maintenance Indicator HIGH.

The Auto Level Indicator 84 may be an LED which shows the status of the Auto Level operation. When the Auto Level mode is selected by switch 82 the Auto Level Indicator 84 can be caused to begin flashing, e.g., at a rate of approximately 1 Hz, and continue flashing until the operation is complete, then it will remain illuminated, indicating that the operation is complete. The Auto Level Indicator 84 will remain ON, 1 as long as the mast 14 is level. When the mast 14 is not level the Auto Level Indicator will be OFF. The Auto Level function cannot be selected unless the mast is fully retracted and the Retract Indicator 80 is ON.

The Auto Stow function is a momentary function selected by switch 82 used to stow the mast 14. The mast will not Auto Stow unless the mast 14 is fully retracted. When Auto Stow is selected by switch 82 the mast 14 is automatically stowed. The signal must remain true until Stow is reached, if it is not the function will terminate. Auto Stow is achieved when the Auto Stow Indicator 86 is on. The Auto Stow function will only operate when the MAINTENANCE switch 88 is in the NORMAL mode of operation.

The Auto Stow Indicator 86 may be an LED which shows the status of the Auto Stow operation. When the Auto Stow mode is selected the Auto Stow Indicator 86 can be caused to begin flashing, e.g., at a rate of approximately 1 Hz, and continue flashing until the operation is complete, then it will remain illuminated, indicating that the operation is complete. The Auto Stow Indicator 86 will remain ON, as long as the mast 14 is stowed. When the mast is not stowed the Auto Stow Indicator 86 will be OFF The Auto Stow function cannot be selected unless the mast is fully retracted and the Retract Indicator 80 is ON.

The Excessive Slope Indicator 90 may be an LED which will turn ON if the system has exceeded a predetermined leveling range of the mast in either the X or Y axis. If the Excessive Slope Indicator 90 is on Extend, Retract, Auto Level, and Auto Stow will not operate until the system is re-orientated within the limits of the system.

The Low Voltage Indicator 92 is a LED which will turn ON if the voltage to the system is at such a level that it could prevent the system from preforming normal operations. This voltage level is dependent on the particular system and is typically set at the factory.

The Maintenance Indicator 94 may be an LED which will turn ON when the system is in the Maintenance mode of operation due to operation of switch 88. In one embodiment of the invention, to place the system in Maintenance mode the control box front panel must be opened and the Maintenance switch 88 placed in Maintenance position. The only functions the system can perform are the ones provided on the maintenance panel, i.e. Limited Extend, Retract, and full travel in the X-axis. The Limited Extend and Retract functions are usually programmed at the factory.

The System Indicator 96 can be configured to work on flash codes.

The Switched Power function at switch 98 turns power onto the system.

The On/Off Indicator 100 will indicate if the system power is ON.

Manual control of the x and y actuators may be implemented by switches 102 and 104, respectively. Whether working in an automatic mode or a manual mode, inputs from x and y level sensors 106 on the frame 22 are provided to the control module, as are then outputs of the X position sensor 108 and Y position sensor 110 associated with the actuators.

The system is capable of acting on a mast and pallet combination that is static or one that is in a dynamic environment such as a moving vehicle. In the case of the moving vehicle, the system would remain active at all times and continually orient the mast to the desired orientation as the slope of the ground changed due to movement of the vehicle.

Figure 10:
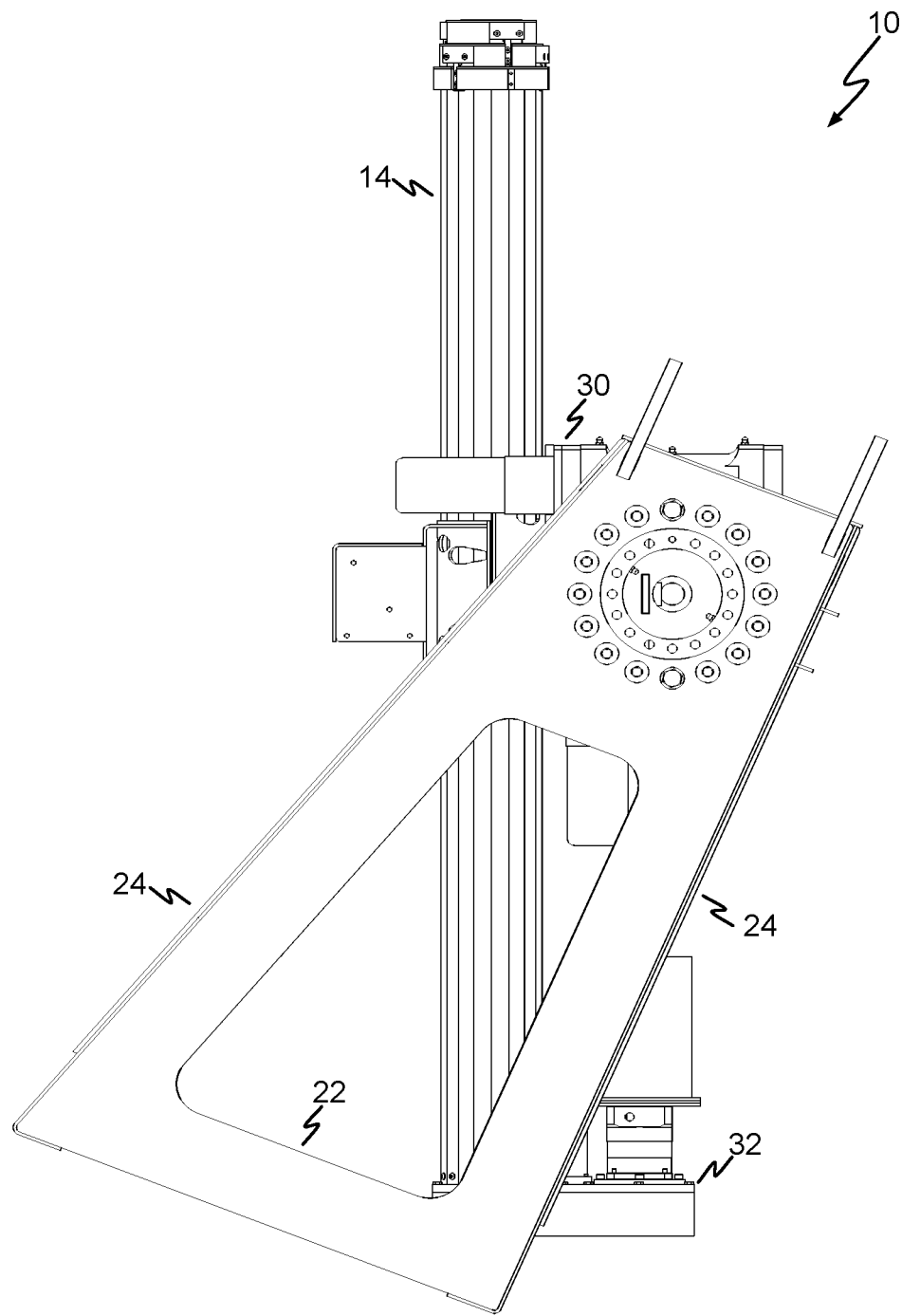
FIG. 10 is a diagram showing a side view of an illustrative embodiment of the present invention in a front-to-rear tilted at-the-ready position.
Figure 11:
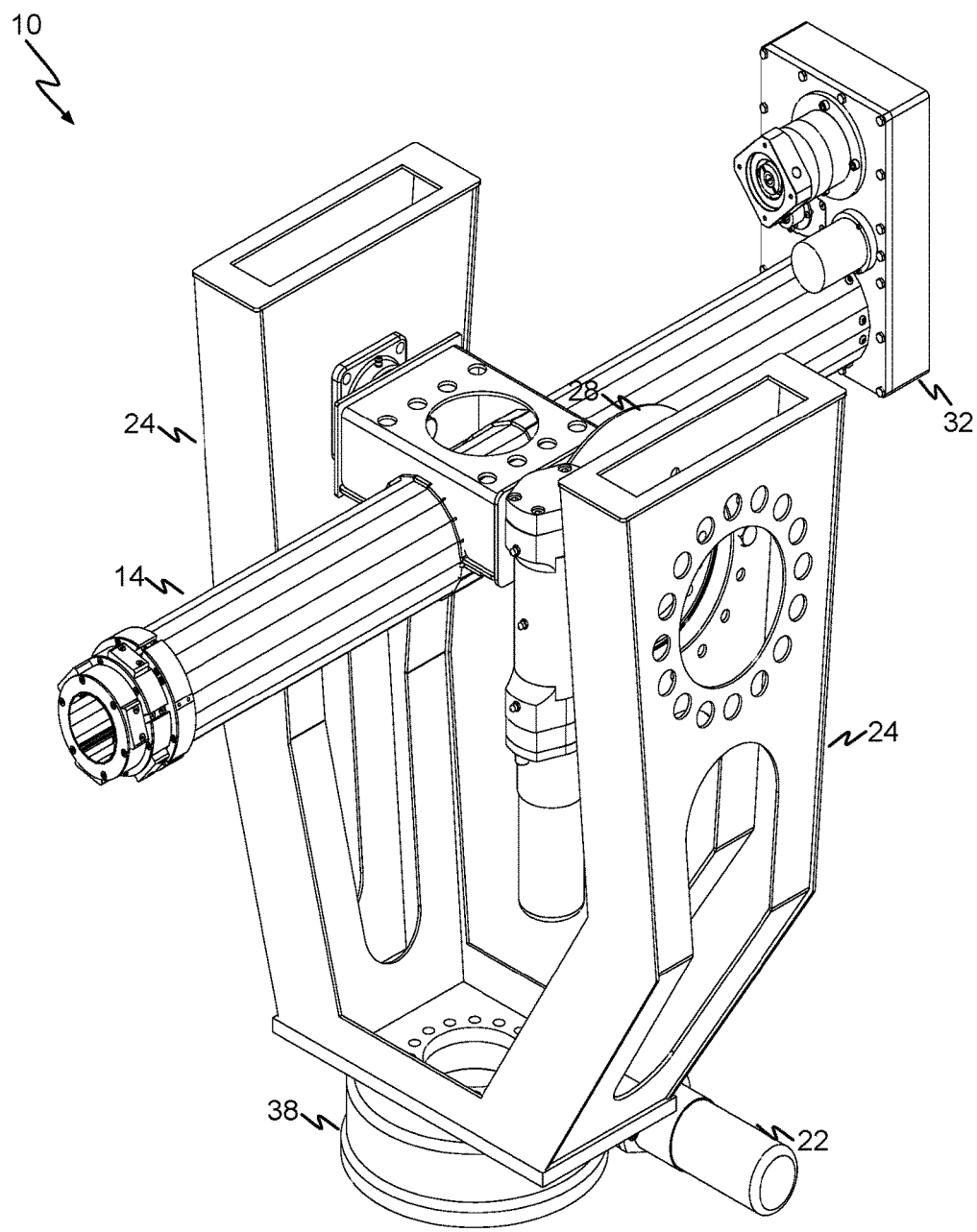
FIG. 11 is a diagram showing an isometric view of an alternate illustrative embodiment of the present invention in a common stowed position.
Figure 12:
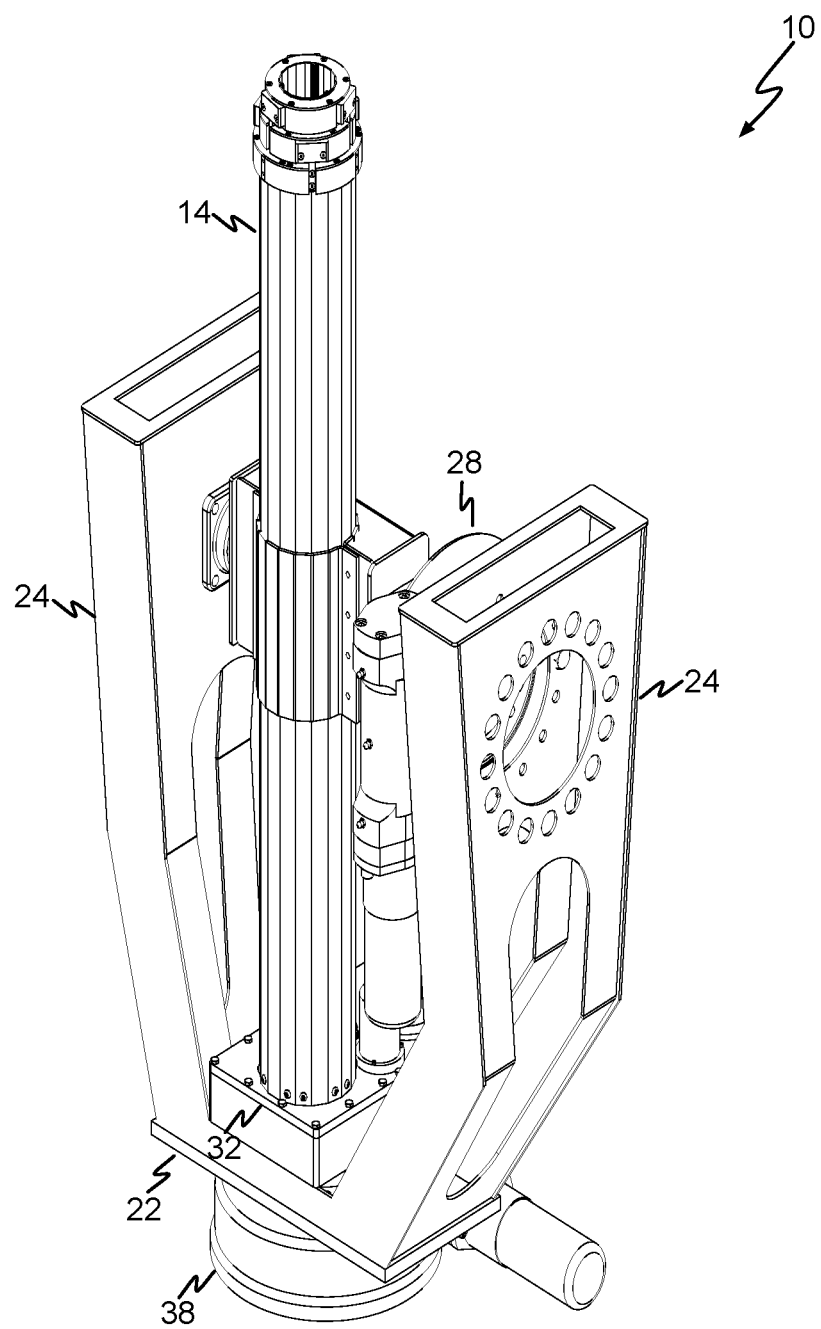
FIG. 12 is a diagram showing an isometric view of the alternate illustrative embodiment of the present invention of FIG. 10 in a common at-the-ready position.

The second depicted embodiment of the design shown in FIGS. 10 and 11 separates the positioning of the rotary actuators allowing for a more compact pallet (or other support structure) to be utilized by the system while still achieving the same performance as the previously depicted embodiment. In this embodiment, at least two rotary positioners are used and at least one is positioned at an intermediate position along the length of the mast and acts directly on the mast at that position. The other rotary positioner has been moved to the outside of the pallet (or other support structure) and acts on the mast by indirectly by rotating the pallet (or other support structure) to which the mast is affixed. This embodiment provides the benefit of a smaller pallet being required in order to achieve the same range of motion afforded by the previous embodiment.

Figure 16:
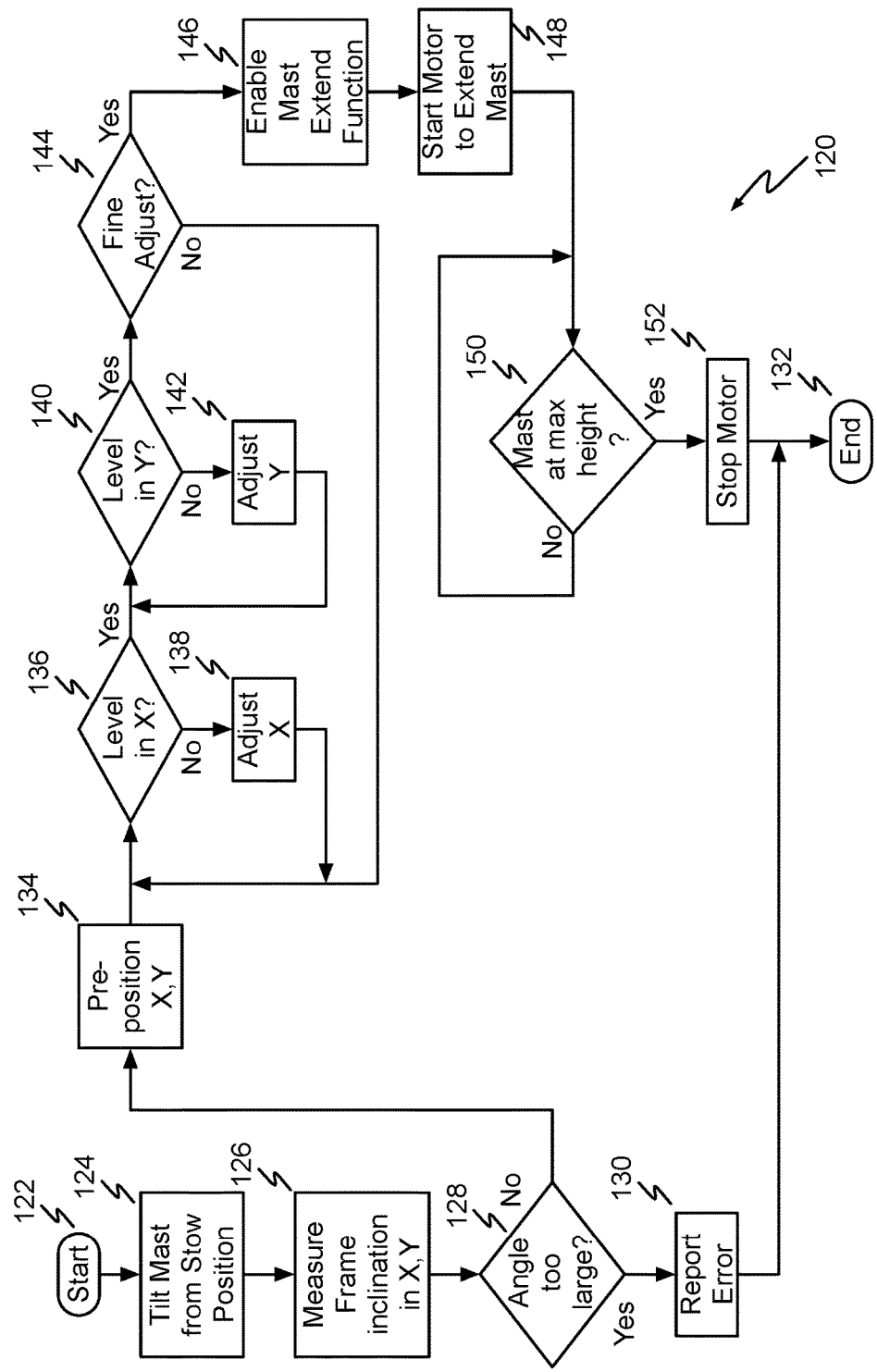
FIG. 16 is a flow diagram showing an illustrative sequence for operating the multi-axial mast positioning system of the present invention.

Referring now to FIG. 16, a flow diagram shows an illustrative sequence 120 for operating the multi-axial mast positioning system of the present invention. The sequence starts at reference numeral 122.

At reference numeral 124 the mast is tilted from the stow position. Next, at reference numeral 126 the frame inclination is measured in both the x and y directions using the inclinometers on the frame. At reference numeral 128 it is determined whether the frame inclination angle is too great to ensure the stability of the extended mast and its payload. The actual maximum angle in any given embodiment will depend on engineering considerations particular to that embodiment and will be easily determinable by persons of ordinary skill in the art.

If the angle is too great, at reference numeral 130 an error is reported and at reference numeral 132 the sequence ends. It can be reinitiated after the vehicle has been repositioned to correct the problem.

If, at reference numeral 128 the angle was within the acceptable range, the sequence proceeds to reference numeral 134 where the mast is pre-positioned to a nominal plumb position based on the measurements that had previously been made at reference numeral 126. At reference numeral 136, an x-orientation reading is taken from the sensors on the mast. If the mast is not plumb in the x direction, the method proceeds to reference numeral 138 where the x-rotation of the mast is corrected. If the mast is plumb in the x direction, the sequence proceeds to reference numeral 140 where a y-orientation reading is taken from the sensors on the mast. If the mast is not plumb in the y direction, the method proceeds to reference numeral 142 where the y-rotation of the mast is corrected. If the mast is plumb in the y direction, the sequence proceeds to reference numeral 144 where the sequence at reference numerals 136, 138, 140, and 142 is repeated to perform a fine adjustment. If the fine adjustment has already been made, the sequence proceeds to reference numeral 146, where the mast extend function is enabled.

At reference numeral 148, the mast extension motor is started to extend the mast. This may be a manual operation or an automatic operation in some embodiments of the invention. At reference numeral 150 the process continues to extend the mast until it has reached its maximum height. The sequence then proceeds to reference numeral 152 where the motor is stopped. The sequence ends at reference numeral 132.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A tiltable telescoping support structure positioning system comprising:
    a frame having first and second opposed support sections;
    a telescoping support structure disposed between the first and second opposed support sections, the telescoping support structure having a plurality of telescoping sections extendable from a base section along a longitudinal axis thereof, the base section of the telescoping support structure coupled to the first and second opposed support sections and tiltable along a first tilt path towards either of the first and second opposed support sections of the frame by application of force at an intermediate position along its length by a first electric or hydraulic actuator having a high backward holding torque capability;
    the base section of the telescoping support structure tiltable along a second tilt path aligned perpendicular to the first tilt path between the first and second opposed support sections of the frame by application of force at the intermediate position along its length by a second electric or hydraulic actuator having a high backward holding torque capability.

2. The tiltable telescoping support structure positioning system of claim 1 further comprising:
    a first orientation sensor coupled to the telescoping support structure to sense an orientation of the telescoping support structure along the first tilt path; and
    a second orientation sensor coupled to the telescoping support structure to sense an orientation about the second tilt path.

3. The tiltable telescoping support structure positioning system of claim 2, further comprising:
    a control system coupled to the first and second orientation sensors and configured to tilt the telescoping support structure along the first and second tilt paths to a substantially vertical orientation in response to signals from the first and second orientation sensors.

4. The tiltable telescoping support structure positioning system of claim 3 wherein the control system is capable of continuous operation.

5. The tiltable telescoping support structure positioning system of claim 1, further comprising:
    a telescoping motor drive coupled to the plurality of telescoping sections of the telescoping support structure to extend and retract the telescoping sections of the telescoping support structure.

6. The tiltable telescoping support structure positioning system of claim 1 wherein the frame is mounted on a mobile platform.

7. A tiltable telescoping support structure positioning system comprising:
    a frame mounted on a mobile platform, the frame having first and second opposed support sections;
    a telescoping support structure disposed between the first and second opposed support sections, the telescoping support structure having a plurality of telescoping sections extendable from a base section along a longitudinal axis thereof, the base section of the telescoping support structure coupled to the first and second opposed support sections and tiltable along a first tilt path towards either of the first and second opposed support sections of the frame by application of force at an intermediate position along its length by;
    the base section of the telescoping support structure tiltable along a second tilt path aligned perpendicular to the first tilt path between the first and second opposed support sections of the frame by application of force at the intermediate position along its length by a second electric or hydraulic actuator having a high backward holding torque capability.

* * * * *